Sept. 30, 1924.

J. CRNOEV 1,510,258

FASTENER FOR SOFT COLLAR POINTS

Filed Nov. 19, 1923

Inventor:
Jan Crnoev.
By Fred'k J. Larson
Attorney.

Patented Sept. 30, 1924.

1,510,258

UNITED STATES PATENT OFFICE.

JAN CRNOEV, OF ST. LOUIS, MISSOURI.

FASTENER FOR SOFT-COLLAR POINTS.

Application filed November 19, 1923. Serial No. 675,534.

*To all whom it may concern:*

Be it known that I, JAN CRNOEV, a subject of the King of Servia, residing in the city of St. Louis and State of Missouri, have invented certain new and useful Improvements in Fasteners for Soft-Collar Points, of which the following is a specification.

This invention relates to fasteners or holders for soft collar points of the turn over style, and has for its object the provision of a device which is a distinct and practical improvement to overcome certain practical objections to, and defects in, the general form of soft collar point fasteners.

A further object of the invention is the provision of a device which will be simple and inexpensive in construction, neat in appearance and highly efficient for the purpose intended.

With the above and other objects in view, the invention consists in the novel and equivalent features of construction, arrangement and combination of parts hereinafter more fully described and finally pointed out in the claims hereto appended.

Referring to the accompanying drawings forming a part of this specification, wherein like characters of reference denote similar parts throughout the several views.

Figure 1:
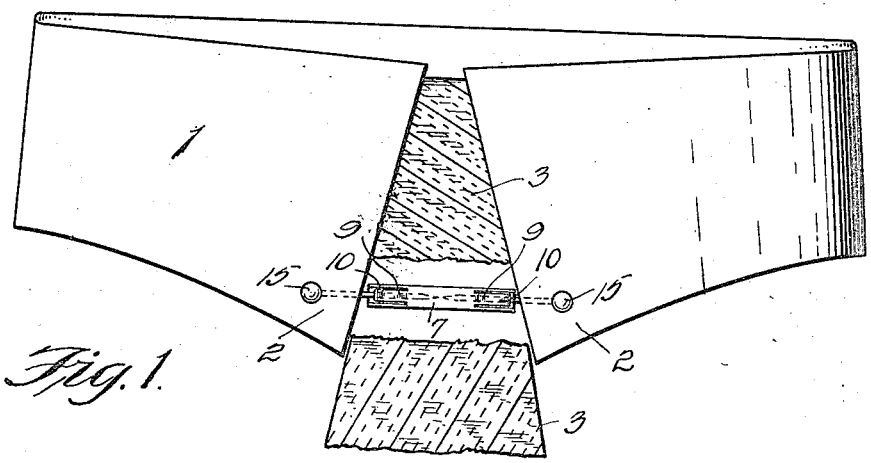
Fig. 1, is a view in perspective of a conventional "soft collar" with a collar fastener applied thereto embodying the features of my present invention.
Figure 2:
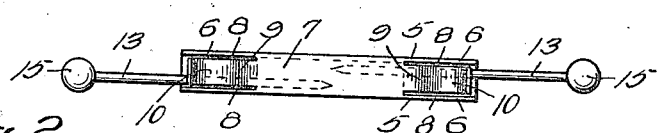
Fig. 2, is an enlarged front elevation of the fastener.
Figure 3:
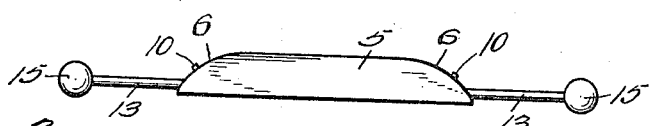
Fig. 3, is a side elevation thereof.

Referring to the drawings, the reference character 1 represents a soft collar for shirts, shirt-waists and the like, and, 2 indicates the points thereof, which, owing to the fact that little or no starch is used in laundering the collar, the points 2 become easily wrinkled and distorted from their supposed shape when worn, thereby causing an unsightly appearance unless properly connected, and, it is to overcome this trouble that I have provided the fastener hereinafter fully described. 3 represents a neck-tie.

In carrying out the aim of my present invention, I employ a suitable tubular open ended socket fastener bar member, which is preferably square walled in cross-section, although not necessarily limited thereto, as other shaped tubular members may be employed, if desired, as is manifest. The fastener member may also be made from any desired material and of any size.

The tubular fastener member consists, as illustrated, of the straight flat back wall 4, the opposed side walls 5 having their corners suitably curved, as at 6, and the front wall 7.

Figure 4:
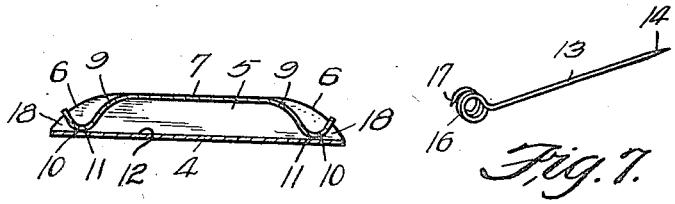
Fig. 4, is a sectional view of the fastener with the fastener pins removed therefrom.

The front wall 7 is provided with opposed slits 8, which extend from the ends of the tubular fastener member to a suitable point inward from the ends thereof to provide opposed yielding embracing lips 9, each having the suitable rearwardly curved ends 10, the inner faces 11 of which normally engage the inner face 12 of the rear wall 4, when the fastener pins 13 are removed, as clearly shown in Fig. 4.

Figure 7:
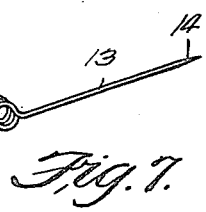
Fig. 7, is a view in perspective of one of the fastener pins with a modified form of head.
Figure 5:
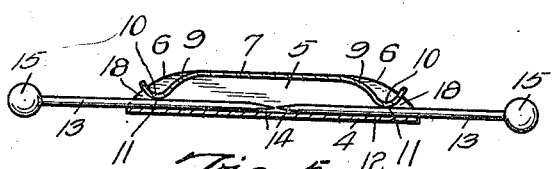
Fig. 5, is a sectional view of the fastener with the pin applied thereto.
Figure 6:
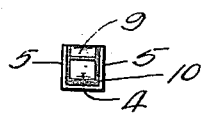
Fig. 6, is an end elevation thereof.

The fastener pins 13, two of which are employed with each tubular socket member, may be of any desired length and made from any suitable material and are each provided with the pointed end 14 for penetrating the collar points 2 when the points 2 are not provided with openings. Each pin is also provided at the opposite end from the point 14 with a suitable head 15, which head is shown as spherical and solid in Figs. 1, 2, 3, and 5, and as coiled, as at 16 and provided with the pointed end 17, as shown in Fig. 7, for penetrating the collar point in applying the same thereto.

It will be observed and understood that when the pins 13 have been applied to the collar points 2 and the pointed ends thereof forced into the tubular fastener member through the V-shaped outer guide ends 18 thereof between the rear wall 4 and the curved ends 10 of the yielding lips 9, that curved end 10 will yieldingly embrace the pins and frictionally hold the pins against the rear wall 4 of the tubular fastener member thereby preventing acidental displacement of the pins within the tubular fastener, or coupling member and prevent accidental loosening of the pins.

From the foregoing description, it is evident that I provide a very simple tubular fastener or coupling member having yieldable lips for frictionally embracing the fastener pins to prevent displacement thereof while applied to a collar for connecting the points 2 thereof.

The many advantages of the herein described invention will readily suggest themselves to those skilled in the art to which it appertains.

I do not desire to be understood as limiting myself to the exact details of construction and arrangement of parts as herein described and illustrated, as it is manifest that variations and modifications may be made without departing from the spirit and scope of my invention and the terms of the following claims, hence I wish it to be understood that I reserve the right to make any such changes, or modifications as may fairly fall within the scope of the appended claims when fairly construed.

What I claim is:

1. In a fastener structure, a four walled tubular member and a curved resilient pin embracing lip formed at each end of one of the walls directed in opposite directions to engage the opposed wall of the tubular member.

2. In a fastener structure, a four walled tubular member and a resilient pin embracing lip formed at each end of one of the walls of said member, the outer ends of said embracing lips being curved inwardly to engage the opposed wall of the tubular member.

3. A fastener member comprising a tubular open ended fastener member having opposite ends curved upon one side of the member and opposed yieldable pin embracing lips formed from one of the walls of the tubular member, the free ends of said lips being curved and normally embracing the inner face of the opposed wall of the fastener member.

4. In a soft collar point fastener structure, a four walled tubular member, a resilient lip disposed at each end of one of the walls of said member and integral at their inner ends therewith, a curved pin embracing section formed at the outer end of each resilient lip and each of said curved pin embracing sections adapted to frictionally engage a pin held in contact with the wall of the fastener opposite said embracing sections.

5. A fastener for soft collar points comprising a tubular coupling member having a pair of opposed inwardly directed yieldable lips, a removable pin for each yieldable lip to embrace and a head for each pin.

6. A fastener member comprising a tubular coupling member having open ends, opposed yieldable lips formed at the ends of said tubular member and a removable head pin for each lip to embrace to prevent accidental longitudinal displacement thereof when in embraced coupled relation.

In testimony whereof, I have hereunto signed by name to the specification.

JAN CRNOEV.